United States Patent
Hasanzadezonuzy et al.

(10) Patent No.: US 12,386,018 B2
(45) Date of Patent: Aug. 12, 2025

(54) COOPERATIVE MEASUREMENT BY CO-LOCATED DEVICES

(71) Applicant: QUALCOMM Incorporated, San Diego, CA (US)

(72) Inventors: Aria Hasanzadezonuzy, Somerville, NJ (US); Navid Abedini, Basking Ridge, NJ (US); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 17/813,773

(22) Filed: Jul. 20, 2022

(65) Prior Publication Data
US 2024/0027569 A1    Jan. 25, 2024

(51) Int. Cl.
| | |
|---|---|
| G01S 5/02 | (2010.01) |
| H04W 64/00 | (2009.01) |
| H04W 72/044 | (2023.01) |
| H04W 72/51 | (2023.01) |

(52) U.S. Cl.
CPC ........... G01S 5/0284 (2013.01); H04W 64/00 (2013.01); H04W 72/046 (2013.01); H04W 72/51 (2023.01)

(58) Field of Classification Search
CPC ... G01S 5/0284; H04W 64/00; H04W 72/046; H04W 72/51; H04W 24/10
USPC ........................................................ 370/331
See application file for complete search history.

(56) References Cited

U.S. PATENT DOCUMENTS

| | | | |
|---|---|---|---|
| 8,559,447 B2 | 10/2013 | Jetcheva et al. | |
| 11,477,117 B1* | 10/2022 | Ramamurthy | H04L 43/10 |
| 2011/0196733 A1* | 8/2011 | Li | G06Q 30/02 |
| | | | 705/14.42 |
| 2014/0112242 A1 | 4/2014 | Vilmur et al. | |
| 2016/0095034 A1* | 3/2016 | Hampel | H04W 36/305 |
| | | | 370/331 |
| 2016/0373970 A1* | 12/2016 | Kulal | H04W 36/0009 |
| 2020/0336920 A1* | 10/2020 | Li | H04W 72/121 |

(Continued)

FOREIGN PATENT DOCUMENTS

| | | |
|---|---|---|
| EP | 2923517 A1 | 9/2015 |
| EP | 3249988 A1 | 11/2017 |

(Continued)

OTHER PUBLICATIONS

Guo H., et al., "Predictor Antenna: A Technique to Boost the Performance of Moving Relays", IEEE, May 5, 2021, arXiv:2012.10537v3 [cs.IT], pp. 1-7, URL: https://doi.org/10.48550/arXiv.2012.10537.

(Continued)

*Primary Examiner* — Kwang B Yao
*Assistant Examiner* — Syed M Bokhari
(74) *Attorney, Agent, or Firm* — Harity & Harrity, LLP

(57) ABSTRACT

Various aspects of the present disclosure generally relate to wireless communication. In some aspects, a node may identify a set of co-located nodes associated with a co-location condition relative to the node. The node may receive, from the set of co-located nodes, measurement information regarding at least one of: a beam measurement, a transmission reception point (TRP) measurement, or a cell measurement. The node may perform a search based at least in part on the measurement information. Numerous other aspects are described.

26 Claims, 11 Drawing Sheets

(56) References Cited

U.S. PATENT DOCUMENTS

2020/0367223 A1* 11/2020 Cheng ............... H04W 72/046
2021/0376907 A1* 12/2021 Zhu .................... H04B 7/0626
2023/0076874 A1* 3/2023 Jeon ................... H04B 17/309

FOREIGN PATENT DOCUMENTS

| WO | WO-2012151284 A1 | 11/2012 |
| WO | 2015177002 A1 | 11/2015 |
| WO | WO-2021002615 A1 | 1/2021 |

OTHER PUBLICATIONS

Mosbah A.B., "Context-Aware Mechanisms for Device Discovery Optimization", Feb. 19, 2018, 164 Pages, URL : https://tel.archives-ouvertes.fr/tel-01712303.

Shahid A., et al., "Self-Organized Energy-Efficient Cross-Layer Optimization for Device to Device Communication in Heterogeneous Cellular Networks", IEEE, vol. 5, Publication Jan. 10, 2017, date of current version Mar. 8, 2017, pp. 1117-1128.

International Search Report and Written Opinion—PCT/US2023/068979—ISA/EPO—Sep. 22, 2023.

* cited by examiner

COOPERATIVE MEASUREMENT BY CO-LOCATED DEVICES

FIELD OF THE DISCLOSURE

Aspects of the present disclosure generally relate to wireless communication and to techniques and apparatuses for cooperative measurement by co-located devices.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a WiFi link, or a Bluetooth link).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a node. The method may include identifying a set of co-located nodes. The method may include receiving, from the set of co-located nodes, measurement information regarding at least one of a beam measurement, a transmission reception point (TRP) measurement, or a cell measurement. The method may include communicating using a communication parameter based at least in part on the measurement information.

Some aspects described herein relate to a method of wireless communication performed by a network node. The method may include identifying a plurality of co-located nodes. The method may include configuring measurements for a set of nodes of the plurality of co-located nodes, the set of nodes including at least two nodes. The method may include receiving measurement information, based at least in part on the measurements, from the set of nodes. The method may include scheduling communications of the plurality of co-located nodes based at least in part on the measurement information.

Some aspects described herein relate to a node for wireless communication. The node may include a memory and one or more processors coupled to the memory. The one or more processors may be configured to identify a set of co-located nodes. The one or more processors may be configured to receive, from the set of co-located nodes, measurement information regarding at least one of a beam measurement, a TRP measurement, or a cell measurement. The one or more processors may be configured to communicate using a communication parameter based at least in part on the measurement information.

Some aspects described herein relate to a network node for wireless communication. The network node may include a memory and one or more processors coupled to the memory. The one or more processors may be configured to identify a plurality of co-located nodes. The one or more processors may be configured to configure measurements for a set of nodes of the plurality of co-located nodes, the set of nodes including at least two nodes. The one or more processors may be configured to receive measurement information, based at least in part on the measurements, from the set of nodes. The one or more processors may be configured to schedule communications associated with the plurality of co-located nodes based at least in part on the measurement information.

Some aspects described herein relate to a non-transitory computer-readable medium that stores a set of instructions for wireless communication by a node. The set of instructions, when executed by one or more processors of the node, may cause the node to identify a set of co-located nodes. The set of instructions, when executed by one or more processors of the node, may cause the node to receive, from the set of co-located nodes, measurement information regarding at least one of a beam measurement, a TRP measurement, or a cell measurement. The set of instructions, when executed by one or more processors of the node, may cause the node to communicate using a communication parameter based at least in part on the measurement information.

Some aspects described herein relate to a non-transitory computer-readable medium that stores a set of instructions for wireless communication by a network node. The set of instructions, when executed by one or more processors of the network node, may cause the network node to identify a plurality of co-located nodes. The set of instructions, when executed by one or more processors of the network node, may cause the network node to configure measurements for a set of nodes of the plurality of co-located nodes, the set of nodes including at least two nodes. The set of instructions, when executed by one or more processors of the network node, may cause the network node to receive measurement information, based at least in part on the measurements, from the at least one node. The set of instructions, when executed by one or more processors of the network node, may cause the network node to schedule communications associated with the plurality of co-located nodes based at least in part on the measurement information.

Some aspects described herein relate to an apparatus for wireless communication. The apparatus may include means for identifying a set of co-located nodes. The apparatus may include means for receiving, from the set of co-located nodes, measurement information regarding at least one of a beam measurement, a TRP measurement, or a cell measurement. The apparatus may include means for communicating using a communication parameter based at least in part on the measurement information.

Some aspects described herein relate to an apparatus for wireless communication. The apparatus may include means for identifying a plurality of co-located nodes. The apparatus may include means for configuring measurements for a set of nodes of the plurality of co-located nodes, the set of nodes including at least two nodes. The apparatus may include means for receiving measurement information, based at least in part on the measurements, from the at least one node. The apparatus may include scheduling communications associated with the plurality of co-located nodes based at least in part on the measurement information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
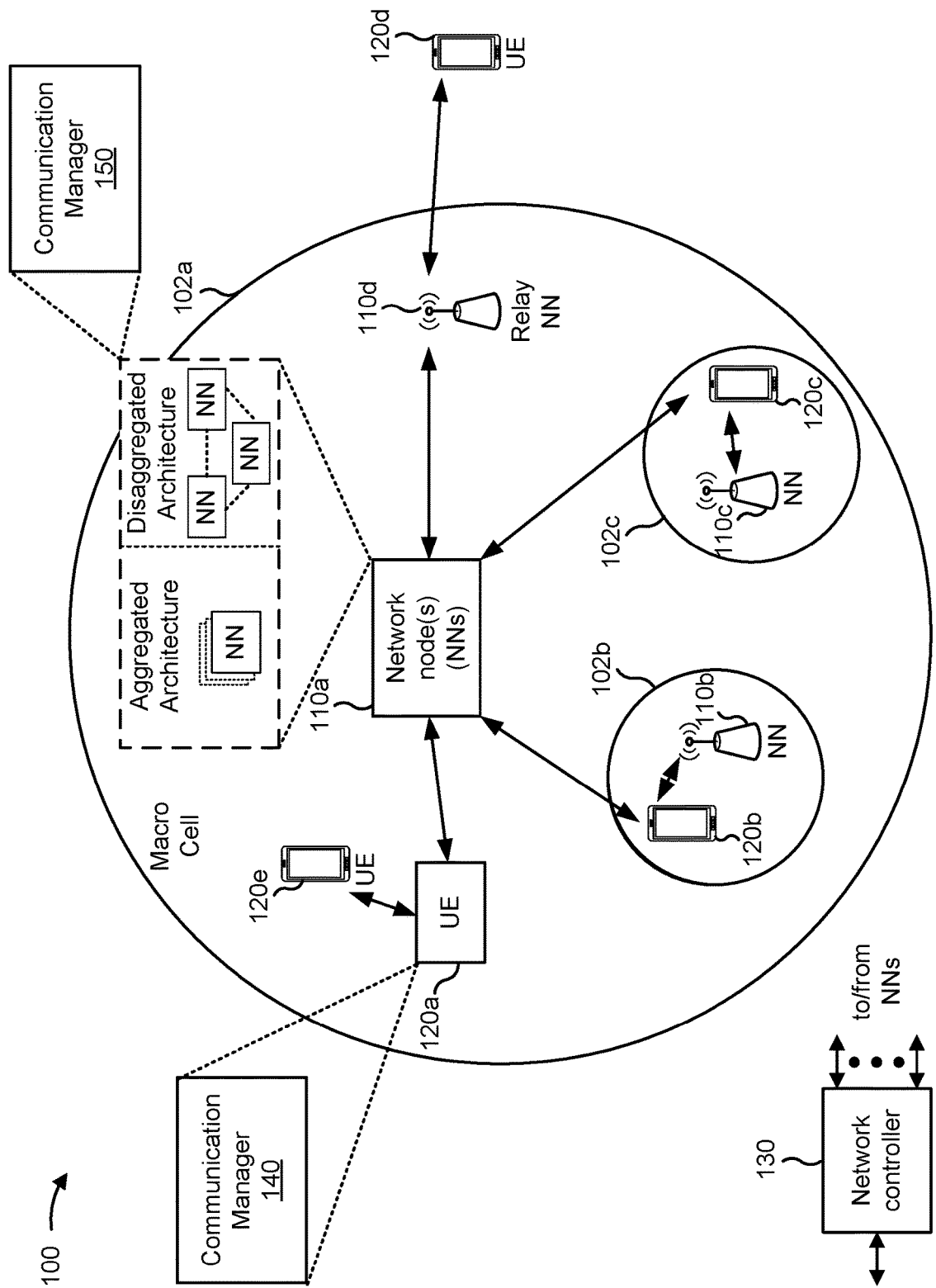
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 includes two or more non-co-located network nodes. A disaggregated network node may be configured to utilize a protocol stack that is physically or logically distributed among two or more network nodes (such as one or more central units (CUs), one or more distributed units (DUs), or one or more radio units (RUs)).

In some examples, a network node 110 includes an entity that communicates with UEs 120 via a radio access link, such as an RU. In some examples, a network node 110 includes an entity that communicates with other network nodes 110 via a fronthaul link or a midhaul link, such as a DU. In some examples, a network node 110 includes an entity that communicates with other network nodes 110 via a midhaul link or a core network via a backhaul link, such as a CU. In some aspects, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another and/or to one or more other network nodes 110 in the wireless network 100 through various types of fronthaul, midhaul, or backhaul interfaces, such as a direct physical connection, an air interface, or a virtual network, using any suitable transport network.

In some aspects, a network node 110 may provide communication coverage for a particular geographic area. In the Third Generation Partnership Project (3GPP), the term "cell" can refer to a coverage area of a base station and/or a base station subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station for a macro cell may be referred to as a macro base station. A base station for a pico cell may be referred to as a pico base station. A base station for a femto cell may be referred to as a femto base station or an in-home base station. In the example shown in FIG. 1, the network node 110a may be a macro base station for a macro cell 102a, the network node 110b may be a pico base station for a pico cell 102b, and the network node 110c may be a femto base station for a femto cell 102c. A base station may support one or multiple (e.g., three) cells.

In some examples, a cell may not necessarily be stationary, and the geographic area of the cell may move according to the location of a network node 110 that is mobile (e.g., a mobile base station).

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120 or network nodes 110. In the example shown in FIG. 1, the network node 110d (e.g., a relay base station) may communicate with the network node 110a (e.g., a macro base station) and the UE 120d in order to facilitate communication between the network node 110a and the UE 120d. A network node 110 that relays communications may be referred to as a relay station, a relay base station, a relay node, a relay, or the like.

The wireless network 100 may be a heterogeneous network that includes network nodes 110 of different types, such as macro base stations, pico base stations, femto base stations, relay base stations, TRPs, RUs, or the like. These different types of network nodes 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul or midhaul communication link. The network nodes 110 may communicate with one another directly or indirectly via a wireless or wireline backhaul communication link. In some aspects, the network controller 130 may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

Deployment of communication systems, such as 5G NR systems, may be arranged in multiple manners with various components or constituent parts. In a 5G NR system, or network, a network node may be implemented in an aggregated or disaggregated architecture. For example, a network node, or one or more units (or one or more components) performing network node functionality, may be implemented as an aggregated network node (sometimes referred to as a standalone base station or a monolithic base station) or a disaggregated network node. "Network entity" or "network node" may refer to a disaggregated network node, an aggregated network node, or one or more entities of a disaggregated network node (such as one or more CUs, one or more DUs, one or more RUs, or a combination thereof).

In some aspects, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of network node functionality. For example, disaggregated network nodes may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated network node may include functionality implemented across two or more units at various physical locations, as well as functionality implemented for at least one unit virtually, which may enable flexibility in network design.

In some aspects, a node (e.g., UE 120, a TRP, or an antenna panel, among other examples) may include a communication manager 140. As described in more detail elsewhere herein, the communication manager 140 may identify a set of co-located nodes; receive, from the set of co-located nodes, measurement information regarding at least one of: a beam measurement, a TRP measurement, or a cell measurement; and communicate using a communication parameter based at least in part on the measurement information. Additionally, or alternatively, the communication manager 140 may perform one or more other operations described herein.

In some aspects, a network node 110 may include a communication manager 150. As described in more detail elsewhere herein, the communication manager 150 may identify a plurality of co-located nodes; configure measurements for a set of nodes of the plurality of co-located nodes, the set of nodes including at least two nodes; receive measurement information, based at least in part on the measurements, from the set of nodes; and scheduling communications of the plurality of co-located nodes based at least in part on the measurement information. Additionally, or alternatively, the communication manager 150 may perform one or more other operations described herein.

As indicated above, FIG. 1 is provided as an example. Other examples may differ from what is described with regard to FIG. 1.

Figure 2:
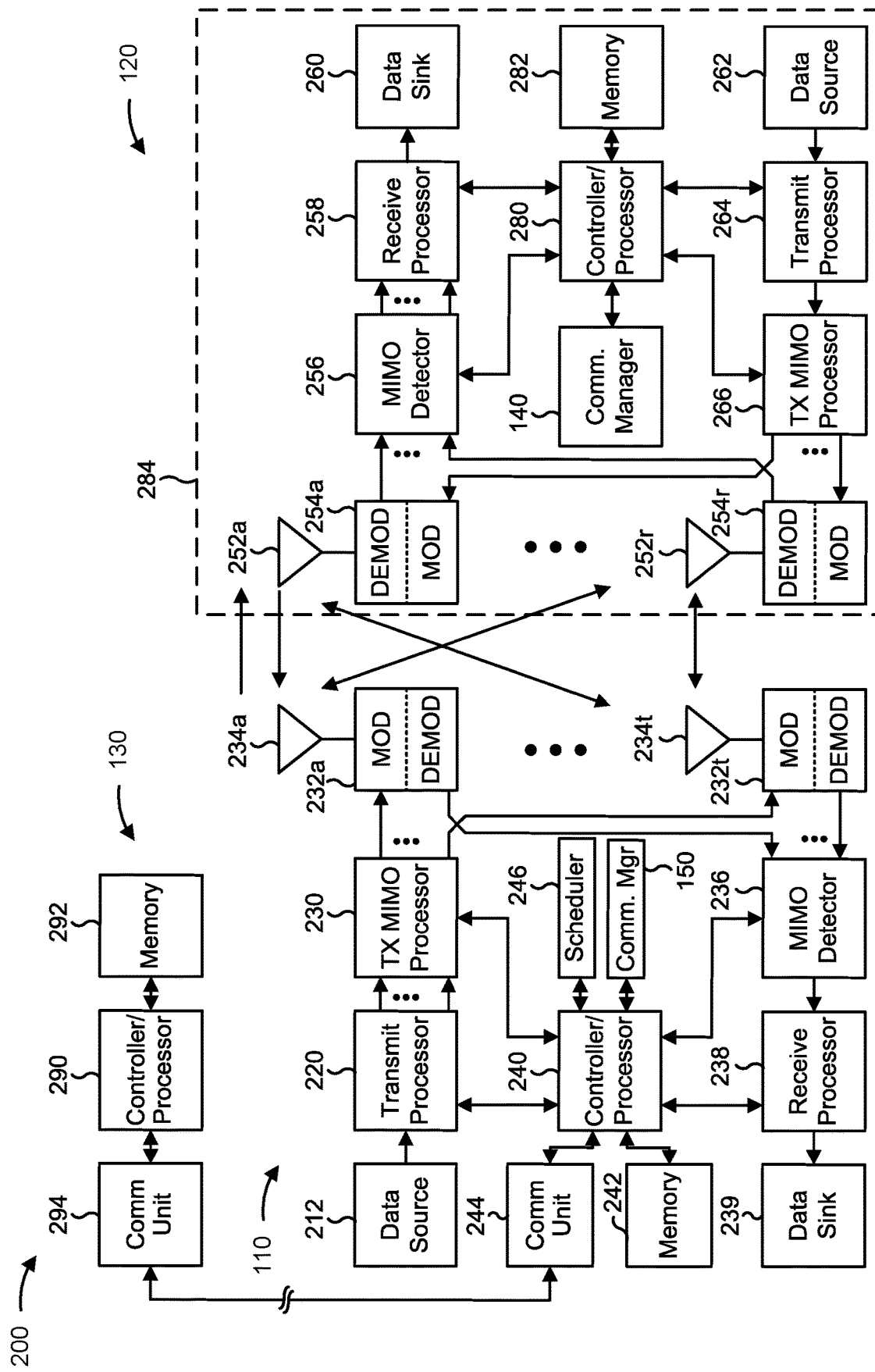
FIG. 2 is a diagram illustrating an example of a base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. For example, some network nodes 110 may not include radio frequency components.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the network node 110, the controller/processor 280 of the UE 120, and/or any other component(s) of FIG. 2 may perform one or more techniques associated with measurement configuration, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9 and/or other processes as described herein. In some examples, executing instructions may include running the instructions, converting the instructions, compiling the instructions, and/or interpreting the instructions, among other examples.

In some aspects, a node (e.g., UE 120, a TRP, or an antenna panel) includes means for identifying a set of co-located nodes; means for receiving, from the set of co-located nodes, measurement information regarding at least one of: a beam measurement, a TRP measurement, or a cell measurement; and/or means for communicating using a communication parameter based at least in part on the measurement information. In some aspects, the means for the node to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for identifying a plurality of co-located nodes; means for configuring measurements for at least one node of the plurality of co-located nodes; means for receiving measurement information, based at least in part on the measurements, from the at least one node; and/or scheduling communications of the plurality of co-located nodes based at least in part on the measurement information. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
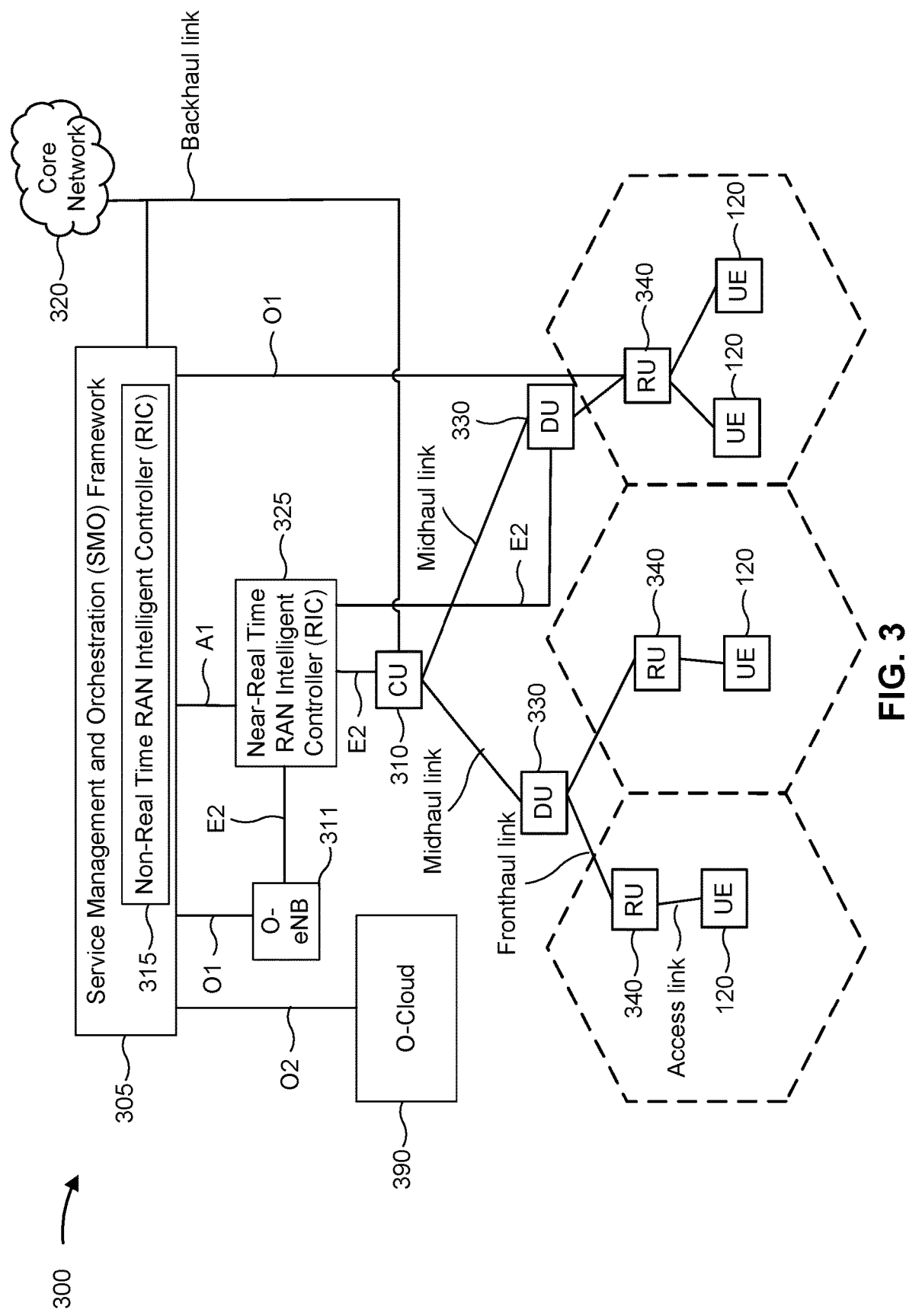
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., network node 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a VCU, a VDU, or a VRU.

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (MC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT MC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
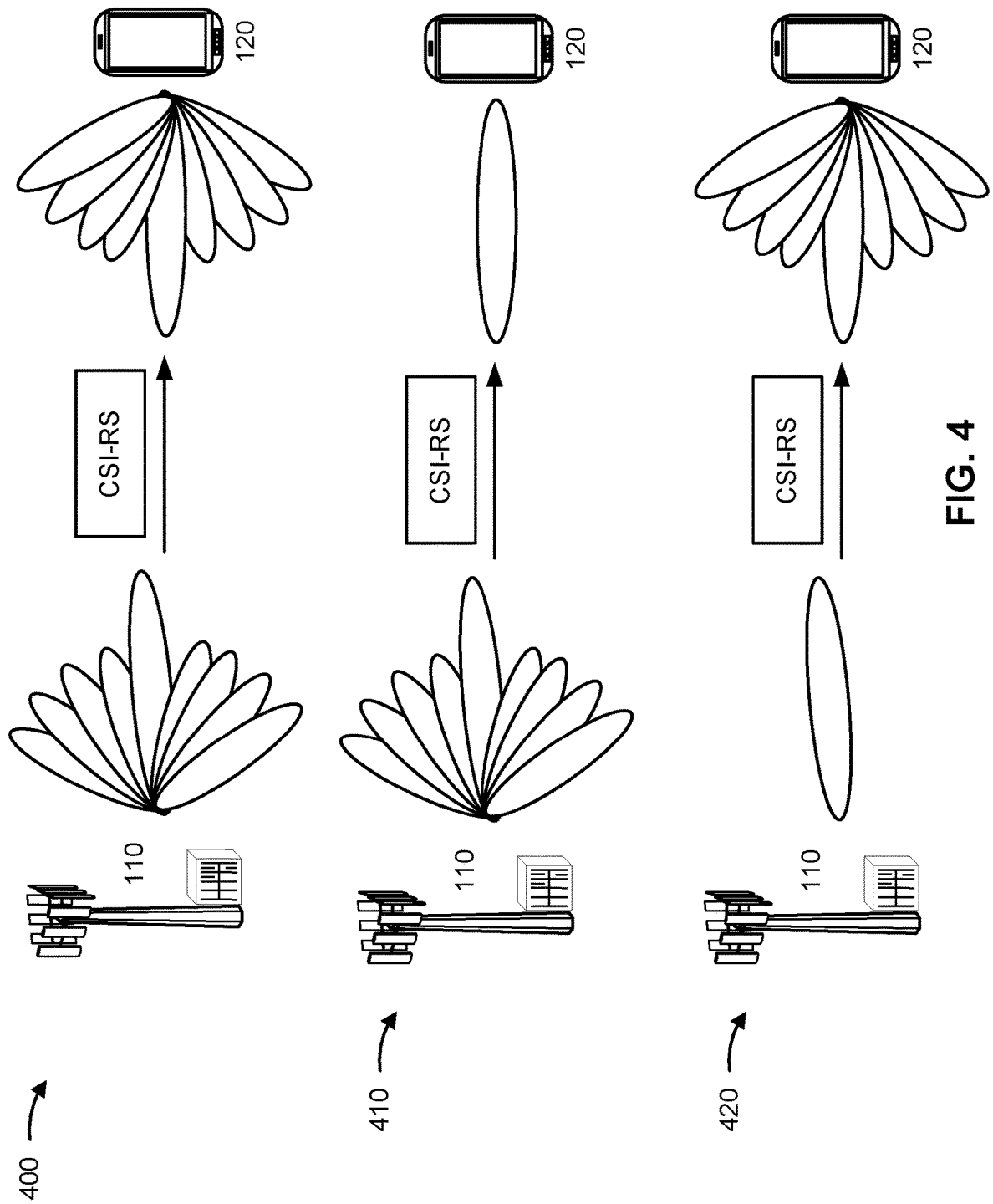
FIG. 4 is a diagram illustrating examples of beam management procedures, in accordance with the present disclosure.

FIG. 4 is a diagram illustrating examples 400, 410, and 420 of channel state information reference signal (CSI-RS) beam management procedures, in accordance with the present disclosure. As shown in FIG. 4, examples 400, 410, and 420 include a UE 120 in communication with a network node 110 in a wireless network (e.g., wireless network 100). However, the devices shown in FIG. 4 are provided as examples, and the wireless network may support communication and beam management between other devices (e.g., between a UE 120 and a network node 110 or TRP, between a mobile termination node and a control node, between an IAB child node and an IAB parent node, and/or between a scheduled node and a scheduling node). In some aspects, the UE 120 and the network node 110 may be in a connected state (e.g., an RRC connected state).

As shown in FIG. 4, example 400 may include a network node 110 and a UE 120 communicating to perform beam management using CSI-RSs. Example 400 depicts a first beam management procedure (e.g., P1 CSI-RS beam management). The first beam management procedure may be referred to as a beam selection procedure, an initial beam acquisition procedure, a beam sweeping procedure, a cell search procedure, and/or a beam detection procedure. As shown in FIG. 4 and example 400, CSI-RSs may be configured to be transmitted from the network node 110 to the UE 120. The CSI-RSs may be configured to be periodic (e.g., using RRC signaling), semi-persistent (e.g., using MAC control element (MAC-CE) signaling), and/or aperiodic (e.g., using downlink control information (DCI)).

The first beam management procedure may include the network node 110 performing beam sweeping over multiple transmit (Tx) beams. The network node 110 may transmit a CSI-RS using each transmit beam for beam management. To enable the UE 120 to perform receive (Rx) beam sweeping, the base station may use a transmit beam to transmit (e.g., with repetitions) each CSI-RS at multiple times within the same RS resource set so that the UE 120 can sweep through receive beams in multiple transmission instances. For example, if the network node 110 has a set of N transmit beams and the UE 120 has a set of M receive beams, the CSI-RS may be transmitted on each of the N transmit beams M times so that the UE 120 may receive M instances of the CSI-RS per transmit beam. In other words, for each transmit beam of the network node 110, the UE 120 may perform beam sweeping through the receive beams of the UE 120. As a result, the first beam management procedure may enable the UE 120 to measure a CSI-RS on different transmit beams using different receive beams to support selection of network node 110 transmit beams/UE 120 receive beam(s) beam pair(s). The UE 120 may report the measurements to the network node 110 to enable the network node 110 to select one or more beam pair(s) for communication between the network node 110 and the UE 120. While example 400 has been described in connection with CSI-RSs, the first beam management process may also use synchronization signal blocks (SSBs) for beam management in a similar manner as described above.

As shown in FIG. 4, example 410 may include a network node 110 and a UE 120 communicating to perform beam management using CSI-RSs. Example 410 depicts a second beam management procedure (e.g., P2 CSI-RS beam management). The second beam management procedure may be referred to as a beam refinement procedure, a base station beam refinement procedure, a TRP beam refinement procedure, and/or a transmit beam refinement procedure. As shown in FIG. 4 and example 410, CSI-RSs may be configured to be transmitted from the network node 110 to the UE 120. The CSI-RSs may be configured to be aperiodic (e.g., using DCI). The second beam management procedure may include the network node 110 performing beam sweeping over one or more transmit beams. The one or more transmit beams may be a subset of all transmit beams associated with the network node 110 (e.g., determined based at least in part on measurements reported by the UE 120 in connection with the first beam management procedure). The network node 110 may transmit a CSI-RS using each transmit beam of the one or more transmit beams for beam management. The UE 120 may measure each CSI-RS using a single (e.g., a same) receive beam (e.g., determined based at least in part on measurements performed in connection with the first beam management procedure). The second beam management procedure may enable the network node 110 to select a best transmit beam based at least in part on measurements of the CSI-RSs (e.g., measured by the UE 120 using the single receive beam) reported by the UE 120.

As shown in FIG. 4, example 420 depicts a third beam management procedure (e.g., P3 CSI-RS beam management). The third beam management procedure may be referred to as a beam refinement procedure, a UE beam refinement procedure, and/or a receive beam refinement procedure. As shown in FIG. 4 and example 420, one or more CSI-RSs may be configured to be transmitted from the network node 110 to the UE 120. The CSI-RSs may be configured to be aperiodic (e.g., using DCI). The third beam management process may include the network node 110 transmitting the one or more CSI-RSs using a single transmit beam (e.g., determined based at least in part on measurements reported by the UE 120 in connection with the first beam management procedure and/or the second beam management procedure). To enable the UE 120 to perform receive beam sweeping, the base station may use a transmit beam to transmit (e.g., with repetitions) CSI-RS at multiple times within the same RS resource set so that UE 120 can sweep through one or more receive beams in multiple transmission instances. The one or more receive beams may be a subset of all receive beams associated with the UE 120 (e.g., determined based at least in part on measurements performed in connection with the first beam management procedure and/or the second beam management procedure). The third beam management procedure may enable the network node 110 and/or the UE 120 to select a best receive beam based at least in part on reported measurements received from the UE 120 (e.g., of the CSI-RS of the transmit beam using the one or more receive beams).

Techniques described herein enable measurement for beam management (among other purposes) based at least in part on a group of nodes being co-located with one another.

As indicated above, FIG. 4 is provided as an example of beam management procedures. Other examples of beam management procedures may differ from what is described with respect to FIG. 4. For example, the UE 120 and the network node 110 may perform the third beam management procedure before performing the second beam management procedure, and/or the UE 120 and the network node 110 may perform a similar beam management procedure to select a UE transmit beam.

Figure 5:
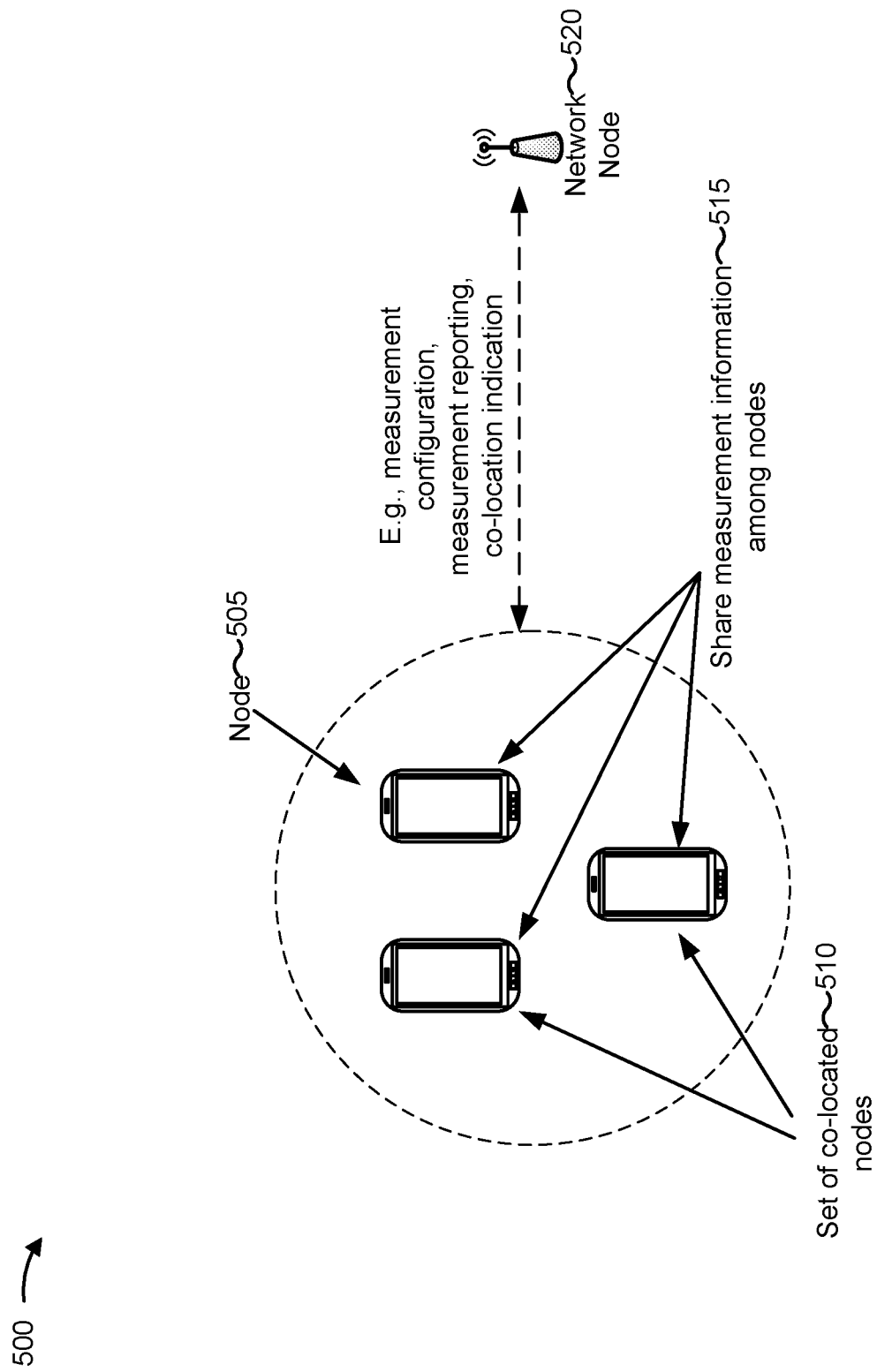
FIG. 5 is a diagram illustrating an example of measurement information sharing among co-located nodes, in accordance with the present disclosure.

FIG. 5 is a diagram illustrating an example 500 of measurement information sharing among co-located nodes, in accordance with the present disclosure.

A node 505 (such as a UE, a TRP, or an antenna panel, among other examples) may perform measurements to facilitate wireless communication. Examples of such measurement include measurements associated with beam management procedures, channel state information (CSI) measurement for the purpose of measurement reporting, measurements for cell detection, selection, reselection, or handover, and measurements for channel access, sidelink node detection, among other examples. In some cases, the node 505 may be co-located with one or more other nodes 510 (shown as a set of co-located nodes 510). A node 510 may include a UE, a TRP, or an antenna panel, among other examples. In some aspects, the node 505 and the node 510 may be the same type of node (e.g., the node 505 and the node 510 may all be TRPs, all UEs, or all antenna panels). The node(s) 510 may also perform measurements, such as the measurements described in connection with the node 505. Nodes 505 and 510 may be considered co-located with one another based at least in part on a co-location condition.

The measurements performed by nodes that are co-located with one another (such as within a "coherent distance" which may be based at least in part on a distance within which a channel remains coherent) may not be independent from node to node. A coherent distance is a distance defining an area (e.g., a radius) within which variation in signal strength, due to reflections from surfaces between the transmitter and the receiver, is expected to be lower than a threshold. For example, given a frequency $f_c$, a coherent distance may be defined as $\lambda/4$, wherein $\lambda=c/f_c$. For example, measurement information determined by a first node 505/510 may be usable by a second node 505/510 for some purposes, depending on the type of the measurement information. Traditionally, this measurement information has been determined and utilized by each node 505/510 separately. However, an increasing variety of nodes can be co-located with one another. For example, multiple UEs (such as smartphones, shown as nodes 505/510) may be situated in a vehicle and may move together and be located in close proximity to one another. As another example, a vehicle may be equipped with a modem (e.g., a node 505), and one or more UEs (e.g., nodes 510) may be located in the vehicle. As yet another example, two or more antenna panels or TRPs (e.g., nodes 510) may be mounted on a vehicle and associated with a controller such as a vehicle UE (V-UE) or a network node (e.g., a node 505). If each of these co-located nodes 505 and 510 performs measurement independently of one another, significant reporting or configuration overhead may be incurred, measurement load may be increased, and wireless communication performance of the co-located nodes 505 and 510 may be sub-optimal relative to if measurements are coordinated between the co-located nodes 505 and 510 (thereby reducing overhead and measurement resource usage associated with performing redundant measurements, among other benefits) or combined measurement reporting is performed (thereby reducing reporting overhead, among other benefits).

Some techniques described herein provide sharing of measurement information between co-located nodes 505 and 510, as shown by reference number 515. In some aspects, the nodes 505 and 510 identify a set of co-located nodes (for example, the node 505 may identify the nodes 510 as associated with a co-location condition relative to the node 505) and share measurement information among one another. The nodes 505 and 510 may use the shared measurement information for reducing the processing complexity of beam/TRP/cell detecting, lowering an individual measurement load, providing combined measurement reporting to a network node 520, and so on. Thus, processing efficiency is improved, measurement load is reduced, and reporting overhead is reduced. In some other aspects, a network node 520 (e.g., network node 110) may use information regarding the co-location condition of the nodes 505/510 to simplify or improve measurement reports or measurement configurations. For example, the network node 520 may use this information to reduce signaling overhead of redundant measurement reports by simplifying the measurement configuration of the nodes 505/510. As another example, the network node 520 may use this information to combine multiple measurements (e.g., by jointly evaluate measurements from multiple nodes 505/510) to improve communication and configuration with the nodes 505 and 510. Thus, efficiency is increased, throughput is increased, and the performance of wireless communications between the nodes 505/510 and the network node 520 is improved.

As shown, signaling between the network node 520 and the nodes 505/510 may include, for example, a measurement configuration, measurement reporting, a co-location indication, and so on. Such signaling is described in more detail below.

Figure 6:
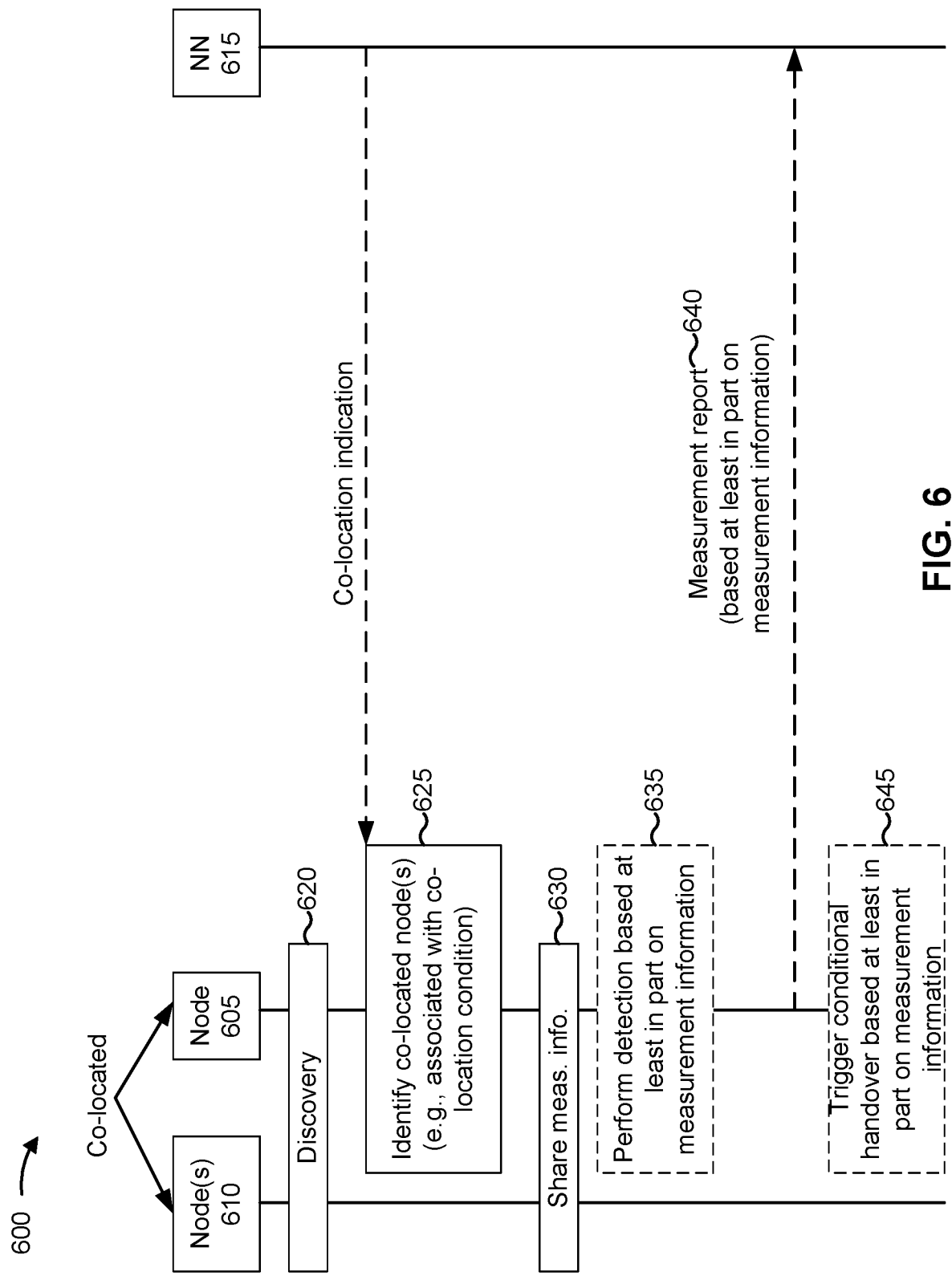
FIG. 6 is a diagram illustrating an example of sharing measurement information between co-located nodes, in accordance with the present disclosure.

FIG. 6 is a diagram illustrating an example 600 of sharing measurement information between co-located nodes, in accordance with the present disclosure. As shown, example 600 includes a node 605 (e.g., node 505) associated with a set of nodes 610 (e.g., node 510), as well as a network node 615 (e.g., network node 110, network node 520). In example 600, the node 605 and the set of nodes 610 are co-located with one another. The set of nodes 610 includes one or more nodes. The node 605 and the set of nodes 610 may be collectively referred to as a plurality of co-located nodes. The plurality of co-located nodes includes two or more nodes. A node 605 can include, for example, UE 120, a TRP, or an antenna panel, among other examples. A node 610 can include, for example, UE 120, a TRP, or an antenna panel, among other examples.

A TRP may include a DU and/or an RU. A TRP may be associated with an access node controller (ANC), such as a CU. A TRP may provide radio connectivity to UEs. A UE may communicate with one or more TRPs at a time. TRPs may be differentiated by a parameter referred to as a control resource set (CORESET) pool index. A first TRP may be assigned a first CORESET pool index, and a second TRP may be assigned a second CORESET pool index. Communications associated with a given TRP may be assigned a corresponding CORESET pool index.

As shown in FIG. 6, and by reference number 620, the node 605 may discover the set of nodes 610. For example, the node 605 may discover other nodes including the set of nodes 610. In some aspects, the set of nodes 610 may discover the node 605. In some aspects, a first node of the set of nodes 610 may discover a second node of the set of nodes 610. For example, the set of nodes 610 and the node 605 may discover one another. References herein to the node 605 discovering the set of nodes 610 should be understood to also apply to a node 610 discovering the node 605 or another node 610.

In some aspects, the node 605 may discover the set of nodes 610 based at least in part on information received from the network node 615. For example, the network node 615 may provide, to the node 605, information identifying the set of nodes 610 and/or other nodes, and the node 605 may discover the set of nodes 610 according to this information. In some implementations, the information may identify the set of nodes 610 and/or the other nodes based at least in part on the node 605 being with a threshold distance of the set of nodes 610 and/or the other nodes. In some other implementations, the information may identify the set of nodes 610 and/or the other nodes based at least in part on a grouping of the set of nodes 610 and/or the other nodes belonging to a same group as the node 605 (e.g., a group of TRPs of a same gNB, a group of antenna panels of a same V-UE, or the like).

In other aspects, the node 605 may discover the set of nodes 610 based at least in part on a sidelink interface. For example, the node 605 may discover the set of co-located nodes using a sidelink discovery procedure, such as a solicitation based sidelink discovery procedure or an advertisement based sidelink discovery procedure. In further aspects, the node 605 may discover the set of nodes 610 based at least in part on a RAT interface, such as a WiFi interface, a Bluetooth interface, or the like. For example, the node 610 may use a discovery and/or communication procedure associated with the RAT interface to discover the set of nodes 610.

As shown by reference number 625, the node 605 may identify the set of nodes 610 that are co-located notes relative to the node 605. In some aspects, the node 605 may identify that the set of nodes 610 are associated with the co-location condition. In some aspects, the node 605 may select the set of nodes 610, from a plurality of nodes identified via discovery at reference number 620, based at least in part on the co-location condition. For example, the node 605 may select nodes that are associated with the co-location condition.

In some aspects, the node 605 may identify the set of nodes 610 based at least in part on information communicated among the set of nodes 610. For example, the communicated information may include location information, measurement information, or the like. "Measurement information" is measurement information relating to the set of nodes 610. For example, measurement information may include measurement information obtained before identifying the set of nodes 610. In some aspects, the measurement information may include historical measurement information, such as measurement information obtained during an earlier time window. In some aspects, the measurement information may include measurement information based at least in part on measurements performed by the node 605, measurements performed by the set of nodes 610, measurements performed by another device, or a combination thereof. In some aspects, the node 605 may identify a co-located node based at least in part on the communicated information indicating that the node is within a threshold distance of the node 605 or is associated with a moving speed or velocity which is lower than a threshold speed or velocity difference relative to the node 605. In some aspects, the node 605 may identify a co-located node based at least in part on the measurement information being within a threshold (e.g., a similarity threshold) of the node's 605 separately determined (its own) measurement information.

In some aspects, the node 605 may identify the set of nodes 610 based at least in part on a co-location indication received from the network node 615. The co-location information may include information identifying the set of nodes 610 as co-located with the node 605. For example, the co-location information may indicate a plurality of co-located nodes including the node 605 and the set of nodes 610. The network node 615 may identify the plurality of co-located nodes based at least in part on measurements reported to the network node 615 by the plurality of co-located nodes, current location information and/or earlier location information associated with the plurality of co-located nodes, or the like. In some aspects, the network node 615 may provide the co-location indication based at least in part on a request from the node 605 or a node 610. For example, the request may be associated with identifying the set of nodes 610 (e.g., the request may indicate for the network node 615 to provide the co-location indication). In some aspects, the network node 615 may configure the node 605 and/or one or more nodes 610 to identify co-located nodes based at least in part on the request. For example, the network node 615 may configure a node 605/610 to perform measurements (such as sidelink measurements) and report measurement information based at least in part on these measurements to the network node 615 or to other nodes 605/610. The network node 615 or the nodes 605/610 may use such measurement information to identify the set of nodes 610.

As shown by reference number 630, the node 605 and the set of nodes 610 may share measurement information with one another. In some aspects, all of the nodes 605/610 may share measurement information with one another (such as by transmitting measurement information using a broadcast or groupcast configuration or over one or more unicast links). In some aspects, a node 605 may selectively share measurement information with a node 610, or a node 610 may selectively share measurement information with a node 605. In some aspects, a node 605/610 may selectively transmit measurement information based at least in part on a configuration received from the network node 615. For example, the configuration may indicate how nodes 605/610 should share measurement information (e.g., resources on which to transmit measurement information, a periodicity or condition associated with sharing measurement information, an interface associated with transmitting measurement information, nodes 605/610 with which to share measurement information, or the like). As another example, the configuration may indicate which measurement information should be shared (e.g., particular types of measurement information, measurement information pertaining to particular nodes, or the like).

In some aspects, a node 605/610 may selectively share measurement information based at least in part on a measurement sharing indication from a network node 615. For example, the measurement sharing information may include, or may be included in, the configuration described above. As another example, the measurement sharing indication may include a signal that triggers the node 605/610 to transmit the measurement information to other co-located nodes.

In some aspects, a node 605/610 may selectively share measurement information based at least in part on a capability of the node. For example, a node 605/610 may selectively transmit measurement based at least in part on a measurement capability of the node 605/610, a transmission capability of the node 605/610, or the like.

In some aspects, a node 605/610 may selectively share measurement information based at least in part on a battery level of the node. For example, the node 605/610 may determine and/or transmit measurement information if a battery level of the node 605/610 satisfies a threshold, and may cease determination and/or sharing of the measurement information if a battery level of the node 605/610 fails to satisfy the threshold.

In some aspects, a node 605/610 may selectively share measurement information based at least in part on a measurement metric at the node. For example, the node 605/610 may transmit the measurement information if the measurement metric (or a set of measurement metrics) satisfies a threshold (or a set of thresholds). The measurement metric may include, for example, an RSRP, an RSRQ, an RSSI, a signal to interference plus noise ratio (SINR), a number of beams detected by the node 605/610 (e.g., a number of nodes associated with a threshold measurement value), or a combination thereof.

In some aspects, a node 605/610 may selectively share measurement information based at least in part on one or more negotiations between the node 605 and the set of nodes 610. For example, the nodes 605/610 may communicate with one another to identify a configuration for sharing measurement, such as a configuration based at least in part on a measurement metric, a capability, a battery level, a device type, or the like. The negotiation may include a first node, of the nodes 605 and 610, providing a proposed configuration, and a second node, of the nodes 605 and 610, accepting and/or modifying the proposed configuration.

In some aspects, a node 605/610 may selectively share measurement information based at least in part on an information ownership parameter. An information ownership parameter includes information indicating an entity that controls whether or not a set of information is shared. For example, measurement information may be assigned an information ownership parameter that indicates which node 605/610 is permitted to share the measurement information. As another example, the information ownership parameter may indicate a subscriber associated with a node 605/610, and the subscriber's preferences may control whether and/or which measurement information is shared by the node 605/610.

In some aspects, the node 605 may be a cluster head of the plurality of co-located nodes. In some aspects, a cluster head is a node of a plurality of nodes (in this case, a plurality of co-located nodes 605/610). The plurality of nodes may be referred to as a cluster. A cluster head may collect measurement information from other nodes of the cluster. In some aspects, the cluster head may be responsible for processing the collected measurement information, reporting the collected measurement information, combining the collected measurement information, and/or using the collected measurement information. For example, the cluster head may generate a combined measurement report, may perform detection based at least in part on the measurement information, may evaluate criteria for transmitting a measurement report, may transmit a measurement report, or may trigger a conditional handover based at least in part on the measurement information, as described elsewhere herein. In some aspects, the cluster head of a cluster may be a V-UE, a controller of one or more IoT devices, or the like.

In some aspects, the measurement information may include information regarding a beam measurement. For example, the measurement information may be based at least in part on a measurement performed as part of a beam management procedure, as described with regard to FIG. 4. As another example, the measurement information may be based at least in part on a measurement performed as part of a sidelink beam management procedure. In some aspects, the measurement information may include information regarding a TRP measurement. For example, the measurement information may be based at least in part on a measurement performed on one or more reference signals transmitted by a TRP. In some aspects, the measurement information may include information regarding a cell measurement. For example, the measurement information may be based at least in part on a measurement performed on one or more reference signals associated with a cell, such as an SSB measurement, a CSI-RS measurement, a DMRS measurement, or the like.

In some aspects, the measurement information may include information associated with a set of detected beams. In some aspects, the measurement information may include information associated with a set of detected TRPs. In some aspects, the measurement information may include information associated with a set of detected cells. For example, the measurement information may include a measurement metric associated with a detected beam, TRP, and/or cell (such as an RSRP, an RSSI, an RSRQ, a signal to noise ratio (SNR), an SINR, or the like). In some aspects, the measurement metric may be an instantaneous metric (such as a Layer 1 metric, which may be an unfiltered metric). In some aspects, the measurement metric may be a filtered metric (such as a Layer 3 metric). In some aspects, the measurement metric may be a statistical value, such as a percentage (e.g., a channel busy ratio, a channel occupancy ratio, or the like). In some aspects, the measurement information may include time information, such as a time interval in which a beam, TRP, or cell was detected. In some aspects, the measurement information may include location information, such as geographical information, spatial information, or the like. For example, the location information may relate to a detected beam, TRP, or cell. In some aspects, the location information may indicate an absolute location (e.g., relative to a fixed location). In some aspects, the location information may indicate a relative location. For example, the relative location may be relative to a node 605/610 reporting measurement information, a node 605/610 receiving the location information, an average of locations of the node 605/610 reporting the measurement information and the node 605/610 receiving the location information, a common reference (such as spatial information relative to a common direction of mobility of the node 605/610 reporting the measurement information and the node 605/610 receiving the location information), or the like. In some aspects, the measurement information may include information indicating an estimated propagation delay or distance. In some aspects, the measurement information may include indicate a resource associated with a detected or measured reference signal or cell. For example, the resource may include a time resource, a frequency resource, a synchronization raster position, or the like.

In some aspects, the measurement information may include an indication that one or more beams, TRPs, or cells are not detected. For example, the indication may indicate that the one or more beams, TRPs, or cells have ceased to be detected. In some aspects, one or more beams, TRPs or cells, which has ceased to be detected, is associated with measurement metrics that has fallen below a threshold, or the like.

In some aspects, the measurement information may include information regarding one or more sidelink devices. For example, at least part of the information described above as being associated with a cell, TRP, or beam can be determined with regard to a sidelink device (e.g., a UE 120) and transmitted as the measurement information.

In some aspects, the measurement information may include a measurement report, a compressed measurement report, or a part of a measurement report. For example, a node 605/610 may transmit a measurement report (or a reduced version of a measurement report such as a compressed measurement report or a part of the measurement report) to another node 605/610.

In some aspects, the measurement information may be transmitted periodically. For example, the node 605/610 may transmit the measurement information according to a periodicity. In some aspects, the measurement information may be transmitted on demand. For example, the node 605/610 may transmit measurement information in connection with receiving a triggering signal. In some aspects, the measurement information may be transmitted based at least in part on a triggering event. For example, the measurement information may be associated with a condition, such as a reporting condition. The node 605/610 may transmit the measurement information based at least in part on determining that the reporting condition is satisfied. In some aspects, the node 605/610 may transmit the measurement information using a combination of periodic transmission, on-demand transmission, or event-triggered transmission. For example, some measurement information may be transmitted periodically, whereas other measurement information may be transmitted on demand or according to a triggering event.

In some aspects, a node 605/610 may transmit an advertisement associated with measurement information. The advertisement may indicate that the node 605/610 has measurement information that can be shared with other co-located nodes 605/610. In some aspects, a co-located node 605/610 may provide a response to the advertisement, such as a request for the measurement information or a triggering signal.

In some aspects, a node 605/610 may transmit a solicitation of measurement information. For example, the solicitation may request all available measurement information of co-located nodes, particular measurement information, a type of measurement information, measurement information in a particular time range, or the like. In some aspects, a co-located node 605/610 may transmit measurement information based at least in part on the solicitation, such as all measurement information available to the network node or measurement information requested by the solicitation.

As shown by reference number 635, in some aspects, the node 605 may communicate using a communication parameter based at least in part on the measurement information. The communication may include a beam detection (as described in connection with FIG. 4), a TRP detection, or a cell detection. The communication parameter may indicate, for example, a priority associated with a beam, TRP, or cell, or one or more parameters used for beam, TRP, or cell detection. In a TRP detection, the node 605 may monitor reference signals transmitted by a TRP for the purpose of communicating with the TRP. In a cell detection, the node 605 may monitor reference signals associated with a cell for the purpose of cell selection, reselection, handover, conditional handover, or the like. In some aspects, the node 605 may identify resources associated with a cell, TRP or beam, a direction associated with the cell, TRP, or beam, a location associated with the cell, TRP, beam, or the like, based at least in part on the measurement information. The node 605 may use this information to perform the detection.

In some aspects, the node 605 may prioritize a beam, TRP, or cell based at least in part on the measurement information indicating that the beam, TRP, or cell is detected. For example, the node 605, when performing the detection, may monitor the prioritized beam, TRP, or cell more frequently or earlier than an unprioritized (or deprioritized) beam, TRP, or cell. In some aspects, the node 605 may deprioritize a beam, TRP, or cell based at least in part on the measurement information indicating that the beam, TRP, or cell is not detected. For example, the node 605, when performing the detection, may monitor the deprioritized beam, TRP, or cell less frequently or later than an unprioritized (or prioritized) beam, TRP, or cell. In some aspects, the node 605 may determine an order and/or priority of beams, cells, or TRPs based at least in part on the measurement information, and may perform the detection according to the order and/or priority.

As shown by reference number 640, in some aspects, the node 605 may transmit a measurement report based at least in part on the measurement information. For example, the measurement report may include a CSI report, a neighbor cell measurement report, a beam report, or the like. In some aspects, the node 605 may transmit a random access channel (RACH) message or another form of signaling associated with accessing a TRP or cell based at least in part on the measurement information. Thus, the node 605 may access a cell or TRP based at least in part on the measurement information. In some aspects, the node 605 may use the measurement information for reporting of the node 605.

As shown by reference number 645, in some aspects, the node 605 may trigger a conditional handover based at least in part on the measurement information. A conditional handover is a handover (e.g., a transfer of the node 605's context) from one network node to another network node. A conditional handover is associated with a condition at the node 605. If the condition is satisfied, the node 605 can trigger the conditional handover. In this example, the node 605 may trigger the conditional handover if the condition is satisfied by the measurement information.

In example 600, the node 605 can perform any one or more of the operations shown by reference numbers 635, 640, and 645.

As indicated above, FIG. 6 is provided as an example. Other examples may differ from what is described with regard to FIG. 6.

Figure 7:
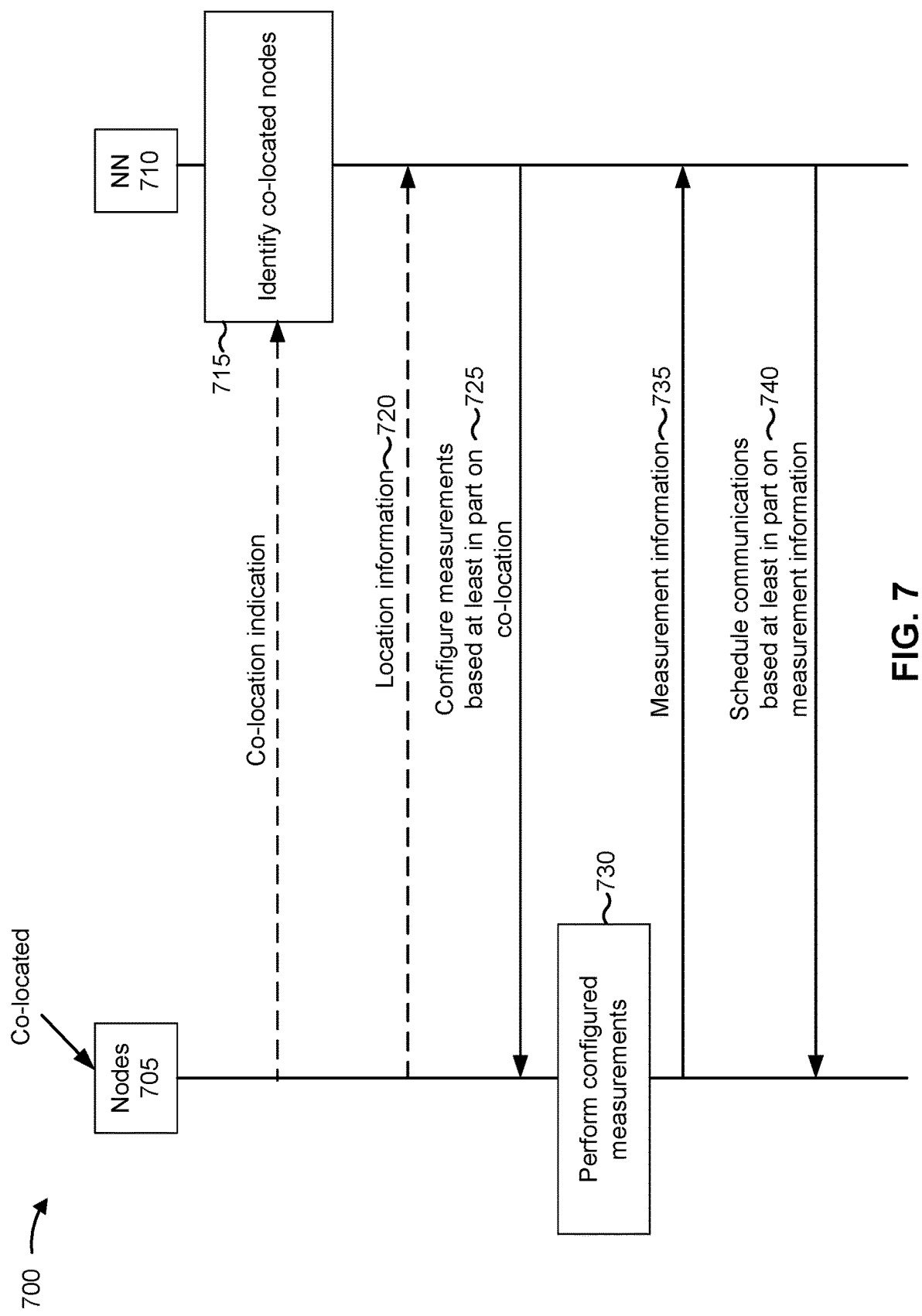
FIG. 7 is a diagram illustrating an example 700 of cooperative measurement as configured at the network, in accordance with the present disclosure.

FIG. 7 is a diagram illustrating an example 700 of cooperative measurement as configured by the network node, in accordance with the present disclosure. As shown, example 700 includes a plurality of co-located nodes 705 and a network node 710 (e.g., network node 110, network node 520, network node 615). The set of co-located nodes 710 includes one or more nodes. A node 705 can include, for example, UE 120, a TRP, or an antenna panel, among other examples. In example 700, the network node 710 may use information regarding co-location of nodes 705 to simplify or improve the measurements and/or configurations of the network node 710.

As shown in FIG. 7, and by reference number 715, the network node 710 may identify the plurality of co-located nodes 705. In some aspects, the network node 710 may identify the plurality of co-located nodes 705 using one or more of the techniques described with regard to reference number 625 of FIG. 6. In some aspects, a node 705 of the plurality of co-located nodes 705 may provide an indication that the plurality of co-located nodes are co-located. For example, the plurality of co-located nodes 705 may identify one another as described with regard to reference number 625 of FIG. 6, and provide an indication, to the network node 710, that the plurality of co-located nodes 705 are co-located.

In some aspects, the network node 710 may identify the plurality of co-located nodes 705 based at least in part on the plurality of co-located nodes 705 belonging to a same group. For example, the network node may identify the plurality of co-located nodes 705 based at least in part on the plurality of co-located nodes 705 being a group of TRPs of a same network node (such as TRPs of a same moving cell or mobile IAB node), being different V-UEs of the same train (where each V-UE is mounted on a different train car of the train), or the like. In the above examples, the plurality of co-located nodes 705 may have a fixed spatial relationship with one another in terms of location, orientation, and/or distance. In some aspects, one or more nodes of the plurality of co-located nodes 705 (e.g., TRPs of a same moving cell or mobile IAB node) may signal information regarding the fixed spatial relationship to the network node 710 (e.g., another TRP of the same moving cell or mobile IAB node), which the network node 710 may use to configure measurements, evaluate measurements, or the like.

As shown by reference number 720, in some aspects, the network node 710 may receive location information indicating a location of a first node 705 of the plurality of co-located nodes 705. The location may be relative to a second node 705 of the plurality of co-located nodes. For example, a DU and a CU (or a CU and another network node) may exchange TRP information over an F1 interface. This TRP information may indicate a geographical location or an orientation of a TRP associated with the DU. In a moving system including a plurality of co-located nodes 705, the geographical location and orientation is not fixed. By signaling the location (e.g., location, orientation, and/or distance) of the first node 705 relative to the second node 705, signaling overhead is reduced relative to repeatedly signaling the locations of both nodes 705 due to changing location information.

As shown by reference number 725, the network node 710 may configure measurements for at least one node 705 of the plurality of co-located nodes 705. For example, the network node 710 may transmit one or more measurement configurations to the at least one node 705. In some aspects, the at least one measurement configuration may be based at least in part on the plurality of nodes 705 being co-located. For example, given a first measurement, a second measurement, and a third measurement, the network node 710 may configure a first node 705 to perform the first measurement, a second node 705 to perform the second measurement, and a third node 705 to perform the third measurement. Thus, overhead, measurement resource usage, and measurement load may be reduced relative to redundantly configuring multiple nodes 705 to perform the same measurement. In some aspects, as described elsewhere herein, the at least one measurement configuration may indicate for a proper subset of the nodes 705 to transmit measurement reporting, thereby reducing signaling overhead of redundant measurement reporting.

As shown by reference number 730, the plurality of nodes 705 may perform the measurements. For example, at least one node 705 of the plurality of nodes 705 may perform the measurements in accordance with the one or more measurement configurations described in connection with reference number 725. In some aspects, the at least one node 705 may share measurement information with other nodes of the plurality of co-located nodes 705, as described in more detail in connection with FIG. 6.

As shown by reference number 735, the plurality of nodes 705 may transmit measurement information, based at least in part on the measurements, to the network node 710. For example, at least one node 705, of the plurality of nodes 705, may transmit measurement information to the network node 710. In some aspects, the measurement information may include a measurement report generated based at least in part on the measurements shown by reference number 730. For example, the at least one node 705 may generate the measurement report and may transmit the measurement report to the network node 710. In some aspects, the at least one node 705 may receive measurement information from other nodes 705, and the at least one node 705 may use the received measurement information to generate a measurement report, as described above with regard to FIG. 6. Thus, overhead is reduced relative to configuring each node 705 to separately perform measurements and measurement reporting.

In some aspects, the network node 710 may combine measurement information of multiple nodes 705. For example, the network node 710 may jointly evaluate measurement information by determining an averaged measurement metric, a composite channel matrix or CSI parameter, or the like.

As shown by reference number 740, the network node 710 may schedule communications of the plurality of co-located nodes 705 based at least in part on the measurement information. For example, the network node 710 may schedule a communication of a first node 705 from which measurement information is not received. The network node 710 may schedule the first node 705's communication based at least in part on measurement information received from a second node 705 of the plurality of co-located nodes 705. Thus, the network node 710 may use the co-located nature of the nodes 705 to reduce overhead and improve efficacy of scheduling.

As indicated above, FIG. 7 is provided as an example. Other examples may differ from what is described with regard to FIG. 7.

Figure 8:
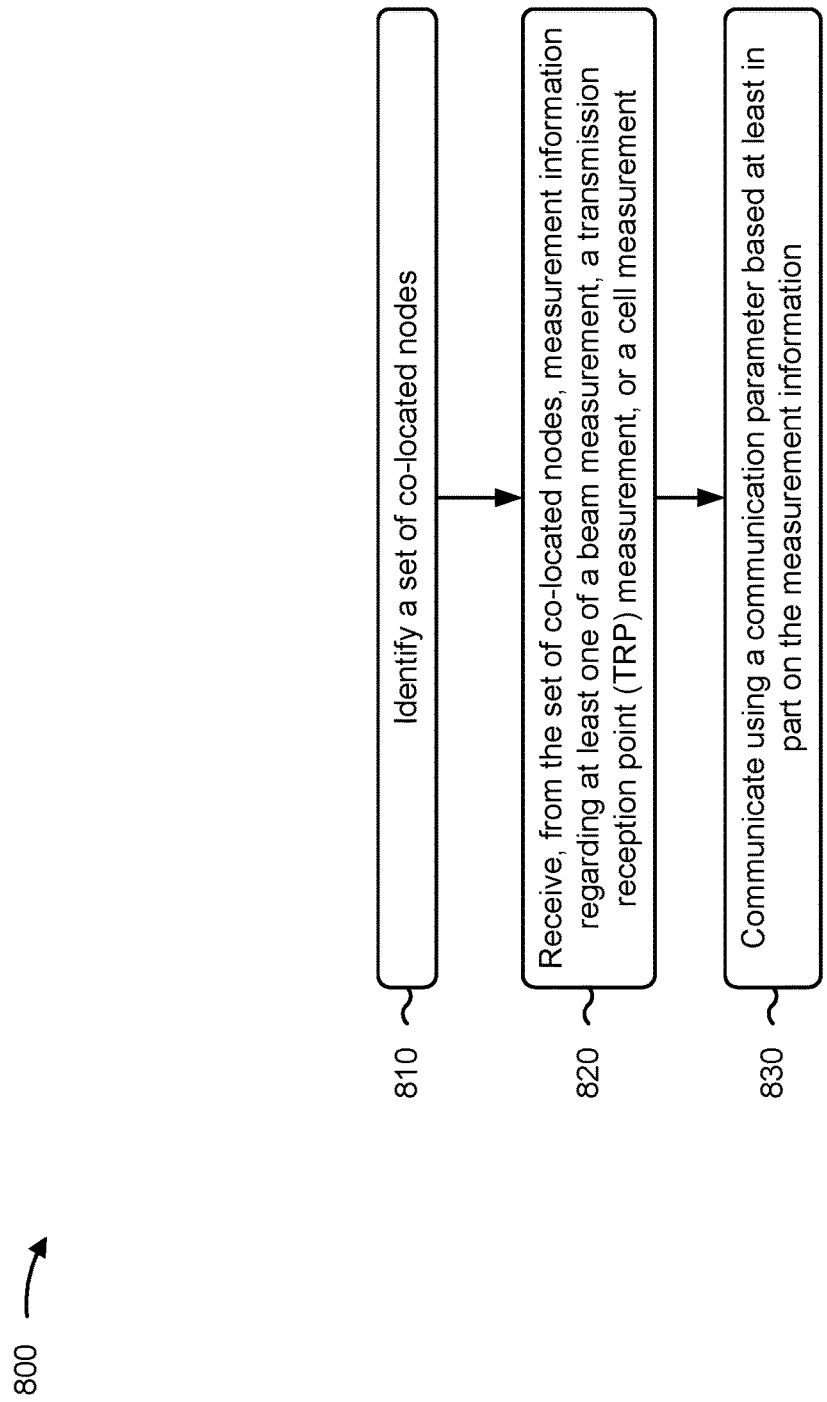
FIG. 8 is a diagram illustrating an example process 800 performed, for example, by a node, in accordance with the present disclosure.

FIG. 8 is a diagram illustrating an example process 800 performed, for example, by a node, in accordance with the present disclosure. Example process 800 is an example where the node (e.g., the node 505, the node 510, the node 605, the node 610, the node 705) performs operations associated with cooperative measurement by co-located devices.

As shown in FIG. 8, in some aspects, process 800 may include identifying a set of co-located nodes (block 810). For example, the node (e.g., using communication manager 140 and/or identification component 1008, depicted in FIG. 10) may identify a set of co-located nodes. In some aspects, the set of co-located nodes are associated with a co-location condition relative to the node, as described above.

As further shown in FIG. 8, in some aspects, process 800 may include receiving, from the set of co-located nodes, measurement information regarding at least one of: a beam measurement, a TRP measurement, or a cell measurement (block 820). For example, the node (e.g., using communication manager 140 and/or reception component 1002, depicted in FIG. 10) may receive, from the set of co-located nodes, measurement information regarding at least one of: a beam measurement, a TRP measurement, or a cell measurement, as described above.

As further shown in FIG. 8, in some aspects, process 800 may include communicating using a communication parameter based at least in part on the measurement information (block 830). For example, the node (e.g., using communication manager 140 and/or detection component 1010, depicted in FIG. 10) may communicate using a communication parameter based at least in part on the measurement information, as described above. As described herein, communicating using a communication parameter can include performing a beam detection, performing a cell detection, performing a TRP detection, and/or deprioritizing or prioritizing a beam, TRP, or cell for detection, among other examples.

Process 800 may include additional aspects, such as any single aspect or any combination of aspects described below and/or in connection with one or more other processes described elsewhere herein.

In a first aspect, communicating using the communication parameter further comprises: performing, based at least in part on the measurement information, at least one of: a beam detection, a TRP detection, or a cell detection.

In a second aspect, alone or in combination with the first aspect, communicating using the communication parameter further comprises deprioritizing a beam, TRP, or cell for detection based at least in part on the measurement information indicating that the beam, TRP, or cell is not detected.

In a third aspect, alone or in combination with one or more of the first and second aspects, communicating using the communication parameter further comprises prioritizing a beam, TRP, or cell for detection based at least in part on the measurement information indicating that the beam, TRP, or cell is detected.

In a fourth aspect, alone or in combination with one or more of the first through third aspects, process 800 includes transmitting a measurement report based at least in part on the measurement information.

In a fifth aspect, alone or in combination with one or more of the first through fourth aspects, process 800 includes triggering a conditional handover based at least in part on the measurement information.

In a sixth aspect, alone or in combination with one or more of the first through fifth aspects, identifying the set of co-located nodes is based at least in part on a co-location indication received from a network node.

In a seventh aspect, alone or in combination with one or more of the first through sixth aspects, process 800 includes transmitting, to the network node, a request associated with identifying the set of co-located nodes, wherein the co-location indication is based at least in part on the request.

In an eighth aspect, alone or in combination with one or more of the first through seventh aspects, identifying the set of co-located nodes is based at least in part on communicating at least one of location information or measurement information with the set of co-located nodes.

In a ninth aspect, alone or in combination with one or more of the first through eighth aspects, the measurement information is first measurement information, and wherein the method further comprises performing a measurement, and selectively transmitting second measurement information, based at least in part on the measurement, to the set of co-located nodes.

In a tenth aspect, alone or in combination with one or more of the first through ninth aspects, selectively transmitting the second measurement information is based at least in part on a configuration received from a network node.

In an eleventh aspect, alone or in combination with one or more of the first through tenth aspects, selectively transmitting the second measurement information is based at least in part on receiving one or more solicitations of the second measurement information from the set of co-located nodes.

In a twelfth aspect, alone or in combination with one or more of the first through eleventh aspects, process 800 includes transmitting an advertisement associated with the second measurement information.

In a thirteenth aspect, alone or in combination with one or more of the first through twelfth aspects, selectively transmitting the second measurement information is based at least in part on at least one of a measurement sharing configuration from a network node, a capability of the node, a battery level of the node, a measurement metric at the node, one or more negotiations between the node and the set of co-located nodes, or an information ownership parameter.

In a fourteenth aspect, alone or in combination with one or more of the first through thirteenth aspects, the measurement information includes at least one of information regarding a set of detected beams, information regarding a set of detected TRPs, information regarding a set of detected cells, an indication that one or more beams, TRPs, or cells are not detected, a measurement report, a compressed measurement report, or a part of a measurement report.

In a fifteenth aspect, alone or in combination with one or more of the first through fourteenth aspects, receiving the measurement information is based at least in part on the node being a cluster head associated with the set of co-located nodes.

In a sixteenth aspect, alone or in combination with one or more of the first through fifteenth aspects, identifying the set of co-located nodes further comprises identifying the set of co-located nodes based at least in part on the set of co-located nodes being associated with a co-location condition.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
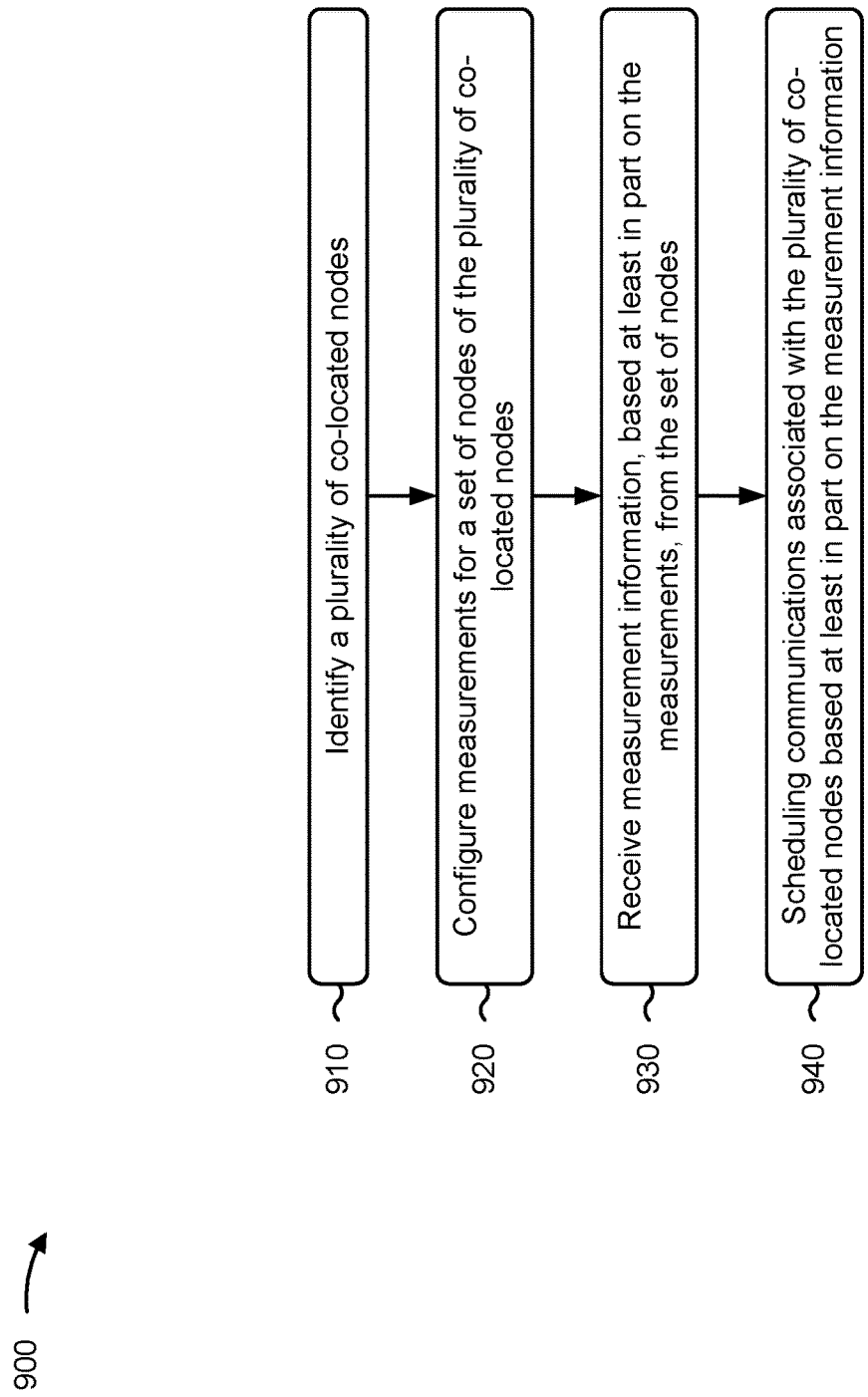
FIG. 9 is a diagram illustrating an example process 900 performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 520, network node 615, network node 710) performs operations associated with cooperative measurement by co-located devices.

As shown in FIG. 9, in some aspects, process 900 may include identifying a plurality of co-located nodes (block 910). For example, the network node (e.g., using communication manager 150 and/or identification component 1108, depicted in FIG. 11) may identify a plurality of co-located nodes, as described above.

As further shown in FIG. 9, in some aspects, process 900 may include configuring measurements for a set of nodes, of the plurality of co-located nodes, the set of nodes including at least two nodes (block 920). For example, the network node (e.g., using communication manager 140 and/or configuration component 1110, depicted in FIG. 11) may configure measurements a set of nodes of the plurality of co-located nodes, as described above. The set of nodes may include at least two nodes As further shown in FIG. 9, in some aspects, process 900 may include receiving measurement information, based at least in part on the measurements, from the set of nodes (block 930). For example, the network node (e.g., using communication manager 150 and/or reception component 1102, depicted in FIG. 11) may receive measurement information, based at least in part on the measurements, from the set of nodes, as described above.

As further shown in FIG. 9, in some aspects, process 900 may include scheduling communications associated with the plurality of co-located nodes based at least in part on the measurement information (block 940). For example, the network node (e.g., using communication manager 140 and/or scheduling component 1112, depicted in FIG. 11) may scheduling communications associated with the plurality of co-located nodes based at least in part on the measurement information, as described above. In some aspects, the plurality of co-located nodes may include a plurality of UEs, and the network node may schedule communications of the plurality of UEs. Additionally, or alternatively, the plurality of co-located nodes may include a plurality of TRPs or antenna panels, and the network node may schedule communications of UEs associated with (e.g., communicating with) the plurality of TRPs or antenna panels.

Process 900 may include additional aspects, such as any single aspect or any combination of aspects described below and/or in connection with one or more other processes described elsewhere herein.

In a first aspect, scheduling communications associated with the plurality of co-located nodes further comprises scheduling a communication associated with a node, of the plurality of co-located nodes, from which measurement information is not received, wherein the communication is scheduled based at least in part on the measurement information.

In a second aspect, alone or in combination with the first aspect, scheduling communications associated with the plurality of co-located nodes is based at least in part on combining measurement information received from two or more nodes of the plurality of co-located nodes.

In a third aspect, alone or in combination with one or more of the first and second aspects, identifying the plurality of co-located nodes is based at least in part on receiving, from one or more nodes of the plurality of co-located nodes, an indication that the plurality of co-located nodes are co-located.

In a fourth aspect, alone or in combination with one or more of the first through third aspects, identifying the plurality of co-located nodes is based at least in part on the plurality of co-located nodes belonging to a same group.

In a fifth aspect, alone or in combination with one or more of the first through fourth aspects, process 900 includes receiving location information indicating a location of a first node of the plurality of co-located nodes, wherein the location is relative to a second node of the plurality of co-located nodes.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
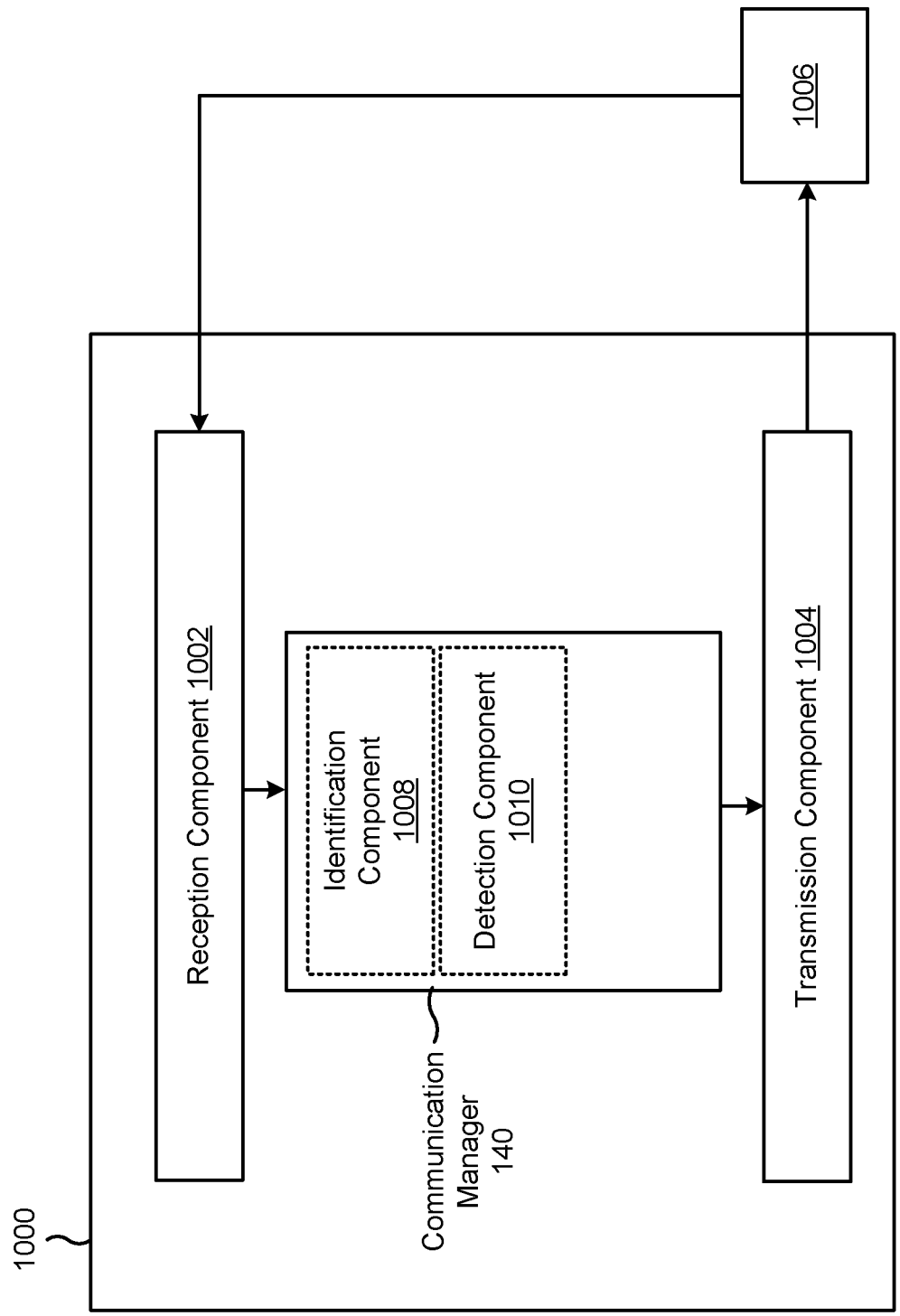
FIG. 10 is a diagram of an example apparatus 1000 for wireless communication, in accordance with the present disclosure.

FIG. 10 is a diagram of an example apparatus 1000 for wireless communication, in accordance with the present disclosure. The apparatus 1000 may be a node, or a node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include one or more of an identification component 1008 or a detection component 1010, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the node described in connection with FIG. 2. In some aspects, the transmission component 1004 may be co-located with the reception component 1002 in a transceiver.

The identification component 1008 may identify a set of co-located nodes. The reception component 1002 may receive, from the set of co-located nodes, measurement information regarding at least one of a beam measurement, a TRP measurement, or a cell measurement. The detection component 1010 or the transmission component 1004 may communicate using a communication parameter based at least in part on the measurement information.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
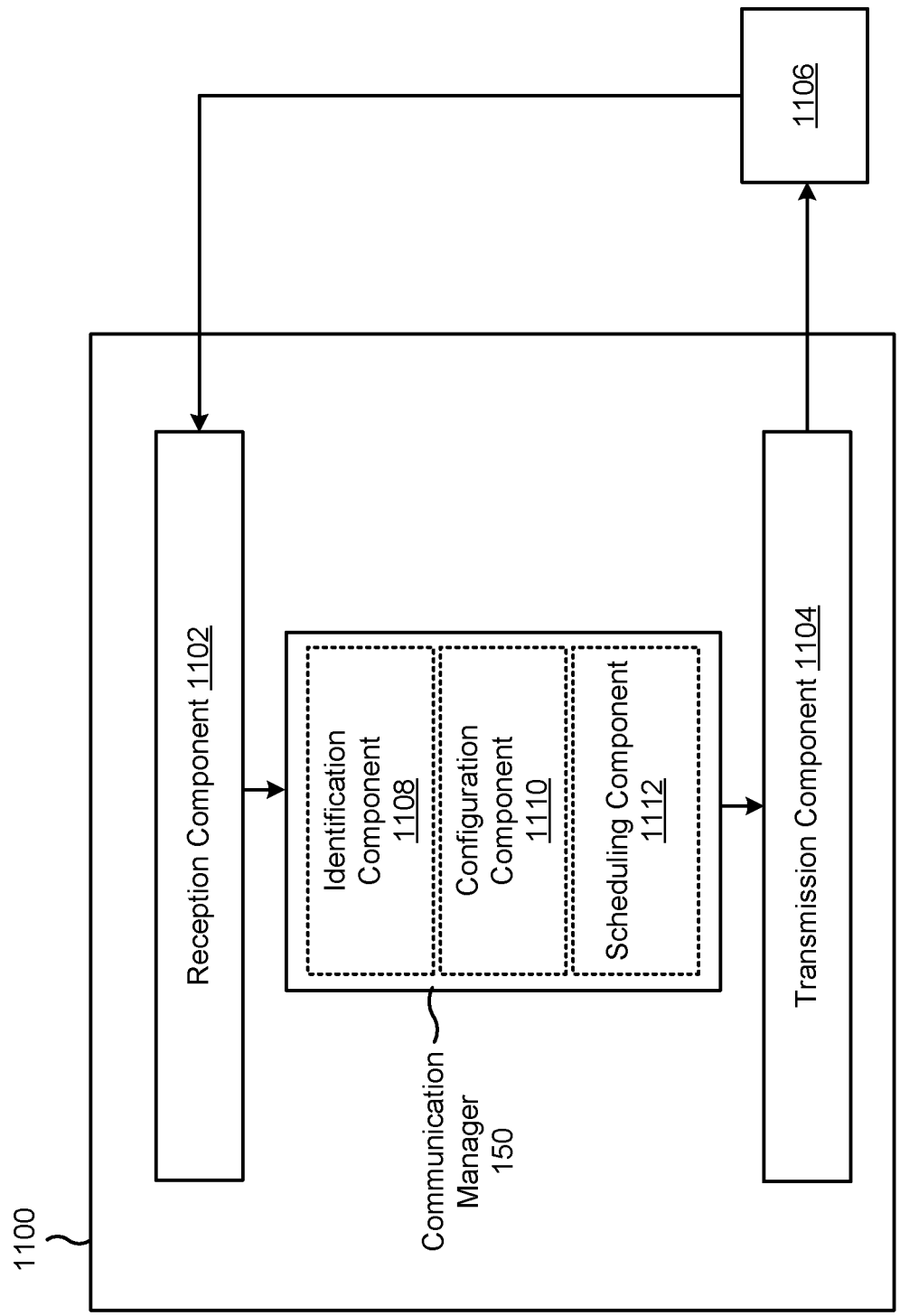
FIG. 11 is a diagram of an example apparatus 1100 for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150. The communication manager 150 may include one or more of an identification component 1108, a configuration component 1110, or a scheduling component 1112, among other examples.

In some aspects, the apparatus 1100 may be configured to perform one or more operations described herein in connection with FIGS. 3-7. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the network node described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the network node described in connection with FIG. 2. In some aspects, the transmission component 1104 may be co-located with the reception component 1102 in a transceiver.

The identification component 1108 may identify a plurality of co-located nodes. The configuration component 1110 may configure measurements for a set of nodes of the plurality of co-located nodes. The reception component 1102 may receive measurement information, based at least in part on the measurements, from the set of nodes. The scheduling component 1112 may schedule communications associated with the plurality of co-located nodes based at least in part on the measurement information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a node, comprising: identifying a set of co-located nodes relative to the node; receiving, from the set of co-located nodes, measurement information regarding at least one of: a beam measurement, a transmission reception point (TRP) measurement, or a cell measurement; and communicating using a communication parameter based at least in part on the measurement information.

Aspect 2: The method of Aspect 1, wherein communicating using the communication parameter further comprises:

performing, based at least in part on the measurement information, at least one of: a beam detection, a TRP detection, or a cell detection.

Aspect 3: The method of any of Aspects 1-2, wherein communicating using the communication parameter further comprises: deprioritizing a beam, TRP, or cell for detection based at least in part on the measurement information indicating that the beam, TRP, or cell is not detected.

Aspect 4: The method of any of Aspects 1-3, wherein communicating using the communication parameter further comprises: prioritizing a beam, TRP, or cell for detection based at least in part on the measurement information indicating that the beam, TRP, or cell is detected.

Aspect 5: The method of any of Aspects 1-4, further comprising: transmitting a measurement report based at least in part on the measurement information.

Aspect 6: The method of any of Aspects 1-5, further comprising: triggering a conditional handover based at least in part on the measurement information.

Aspect 7: The method of any of Aspects 1-6, wherein identifying the set of co-located nodes is based at least in part on a co-location indication received from a network node.

Aspect 8: The method of Aspect 7, further comprising: transmitting, to the network node, a request associated with identifying the set of co-located nodes, wherein the co-location indication is based at least in part on the request.

Aspect 9: The method of any of Aspects 1-8, wherein identifying the set of co-located nodes is based at least in part on communicating at least one of location information or measurement information with the set of co-located nodes.

Aspect 10: The method of any of Aspects 1-9, wherein the measurement information is first measurement information, and wherein the method further comprises: performing a measurement; and selectively transmitting second measurement information, based at least in part on the measurement, to the set of co-located nodes.

Aspect 11: The method of Aspect 10, wherein selectively transmitting the second measurement information is based at least in part on a configuration received from a network node.

Aspect 12: The method of Aspect 10, wherein selectively transmitting the second measurement information is based at least in part on receiving one or more solicitations of the second measurement information from the set of co-located nodes.

Aspect 13: The method of Aspect 10, further comprising: transmitting an advertisement associated with the second measurement information.

Aspect 14: The method of Aspect 10, wherein selectively transmitting the second measurement information is based at least in part on at least one of: a measurement sharing configuration from a network node, a capability of the node, a battery level of the node, a measurement metric at the node, one or more negotiations between the node and the set of co-located nodes, or an information ownership parameter.

Aspect 15: The method of any of Aspects 1-14, wherein the measurement information includes at least one of: information regarding a set of detected beams, information regarding a set of detected TRPs, information regarding a set of detected cells, an indication that one or more beams, TRPs, or cells are not detected, a measurement report, a compressed measurement report, or a part of a measurement report.

Aspect 16: The method of any of Aspects 1-15, wherein receiving the measurement information is based at least in part on the node being a cluster head associated with the set of co-located nodes.

Aspect 17: The method of any of Aspects 1-16, wherein identifying the set of co-located nodes further comprises identifying the set of co-located nodes based at least in part on the set of co-located nodes being associated with a co-location condition.

Aspect 18: A method of wireless communication performed by a network node, comprising: identifying a plurality of co-located nodes; configuring measurements for a set of nodes, of the plurality of co-located nodes, the set of nodes including at least two nodes; receiving measurement information, based at least in part on the measurements, from the set of nodes; and scheduling communications associated with the plurality of co-located nodes based at least in part on the measurement information.

Aspect 19: The method of Aspect 18, wherein scheduling communications associated with the plurality of co-located nodes further comprises: scheduling a communication associated with a node, of the plurality of co-located nodes, from which measurement information is not received, wherein the communication is scheduled based at least in part on the measurement information.

Aspect 20: The method of any of Aspects 18-19, wherein scheduling communications associated with the plurality of co-located nodes is based at least in part on combining measurement information received from two or more nodes of the plurality of co-located nodes.

Aspect 21: The method of any of Aspects 18-20, wherein identifying the plurality of co-located nodes is based at least in part on receiving, from one or more nodes of the plurality of co-located nodes, an indication that the plurality of co-located nodes are co-located.

Aspect 22: The method of any of Aspects 18-21, wherein identifying the plurality of co-located nodes is based at least in part on the plurality of co-located nodes belonging to a same group.

Aspect 23: The method of any of Aspects 18-22, further comprising: receiving location information indicating a location of a first node of the plurality of co-located nodes, wherein the location is relative to a second node of the plurality of co-located nodes.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A node for wireless communication, comprising: one or more memories; and one or more processors, coupled to the one or more memories, which are configured, individually or in any combination, to: identify a set of co-located nodes relative to the node; receive, from the set of co-located nodes, measurement information, which is first measurement information, regarding at least one of: a beam measurement, or a transmission reception point (TRP) measurement; perform a measurement; selectively transmit second measurement information, based on the measurement and on one or more solicitations of the second measurement information from the set of co-located nodes, to the set of co-located nodes; and communicate using a communication parameter based on the first measurement information.

2. The node of claim 1, wherein the one or more processors, to communicate using the communication parameter, are configured to: perform, based on the measurement information, at least one of: a beam detection, a TRP detection, or a cell detection.

3. The node of claim 1, wherein the one or more processors, to communicate using the communication parameter, are configured to: deprioritize a beam, a TRP, or a cell for detection based on the measurement information indicating that the beam, the TRP, or the cell is not detected.

4. The node of claim 1, wherein the one or more processors, to communicate using the communication parameter, are configured to: prioritize a beam, a TRP, or a cell for detection based on the measurement information indicating that the beam, the TRP, or the cell is detected.

5. The node of claim 1, wherein the one or more processors are further configured to: transmit a measurement report based on the measurement information.

6. The node of claim 1, wherein the one or more processors are further configured to: trigger a conditional handover based on the measurement information.

7. The node of claim 1, wherein the one or more processors, to identify the set of co-located nodes, are configured to identify the set of co-located nodes based on a co-location indication of a network node.

8. The node of claim 7, wherein the one or more processors are further configured to: transmit, to the network node, a request associated with identifying the set of co-located nodes, wherein the co-location indication is based on the request.

9. The node of claim 1, wherein the one or more processors, to identify the set of co-located nodes, are configured to identify the set of co-located nodes based on communicating at least one of location information or the measurement information with the set of co-located nodes.

10. The node of claim 1, wherein the one or more processors, to selectively transmit the second measurement information, are configured to selectively transmit the second measurement information based on a configuration from a network node.

11. The node of claim 1, wherein the one or more processors are further configured to:
transmit an advertisement associated with the second measurement information.

12. The node of claim 1, wherein the one or more processors, to selectively transmit the second measurement information, are configured to selectively transmit the second measurement information based on at least one of: a measurement sharing configuration from a network node, a capability of the node, a battery level of the node, a measurement metric at the node, one or more negotiations between the node and the set of co-located nodes, or an information ownership parameter.

13. The node of claim 1, wherein the measurement information includes at least one of:
   information regarding a set of detected beams,
   information regarding a set of detected TRPs,
   information regarding a set of detected cells,
   an indication that one or more beams, TRPs, or cells are not detected,
   a measurement report,
   a compressed measurement report, or
   a part of the measurement report.

14. The node of claim 1, wherein the one or more processors, to receive the measurement information, are configured to receive the measurement information based on the node being a cluster head associated with the set of co-located nodes.

15. The node of claim 1, wherein the one or more processors, to identify the set of co-located nodes, are configured to identify the set of co-located nodes based on the set of co-located nodes being associated with a co-location condition.

16. A network node for wireless communication, comprising: one or more memories; and one or more processors, coupled to the one or more memories, which are configured, individually or in any combination, to: identify a plurality of co-located nodes; configure measurements for a set of nodes, of the plurality of co-located nodes, the set of nodes including at least two nodes; receive measurement information, based on the measurements, from the set of nodes, wherein the measurement information regards at least one of: a beam measurement, or a transmission reception point (TRP) measurement; and schedule communications associated with at least one node of the plurality of co-located nodes, from which the measurement information is not received, based on the measurement information.

17. The network node of claim 16, wherein the one or more processors, to schedule the communications associated with the plurality of co-located nodes, are configured to schedule communications associated with the plurality of co-located nodes based on measurement information received from two or more nodes of the plurality of co-located nodes.

18. The network node of claim 16, wherein the one or more processors, to identify the plurality of co-located nodes, are configured to identify the plurality of co-located nodes based on an indication, from one or more nodes of the plurality of co-located nodes, that the plurality of co-located nodes are co-located.

19. The network node of claim 16, wherein the one or more processors, to identify the plurality of co-located nodes, are configured to identify the plurality of co-located nodes based on the plurality of co-located nodes belonging to a same group.

20. The network node of claim 16, wherein the one or more processors are further configured to:
   receive location information indicating a location of a first node of the plurality of co-located nodes, wherein the location is relative to a second node of the plurality of co-located nodes.

21. A method of wireless communication performed by a node, comprising: identifying a set of co-located nodes relative to the node; receiving, from the set of co-located nodes, measurement information, which is first measurement information, regarding at least one of: a beam measurement, or a transmission reception point (TRP) measurement; performing a measurement; selectively transmitting second measurement information, based on the measurement and on one or more solicitations of the second measurement information from the set of co-located nodes, to the set of co-located nodes; and communicating using a communication parameter based on the first measurement information.

22. The method of claim 21, wherein communicating using the communication parameter further comprises: performing, based on the measurement information, at least one of: a beam detection, a TRP detection, or a cell detection.

23. The method of claim 21, wherein communicating using the communication parameter further comprises: deprioritizing a beam, a TRP, or a cell for detection based on the measurement information indicating that the beam, the TRP, or the cell is not detected.

24. A method of wireless communication performed by a network node, comprising: identifying a plurality of co-located nodes; configuring measurements for a set of nodes, of the plurality of co-located nodes, the set of nodes including at least two nodes; receiving measurement information, based on the measurements, from the set of nodes, wherein the measurement information regards at least one of: a beam measurement, or a transmission reception point (TRP) measurement; and scheduling communications associated with at least one node of the plurality of co-located nodes, from which the measurement information is not received, based on the measurement information.

25. The method of claim 24, wherein scheduling communications associated with the plurality of co-located nodes is based on combining measurement information received from two or more nodes of the plurality of co-located nodes.

26. The method of claim 24, wherein identifying the plurality of co-located nodes is based on receiving, from one or more nodes of the plurality of co-located nodes, an indication that the plurality of co-located nodes are co-located.

* * * * *